United States Patent Office 3,753,981
Patented Aug. 21, 1973

3,753,981
4-AMINO-2-STYRYLQUINAZOLINE COMPOUNDS
Hermann Breuer, Burgweinting, and Ernst Schulze, Regensburg, Germany, assignors to E. R. Squibb & Sons, Inc., New York, N.Y.
No Drawing. Filed July 15, 1970, Ser. No. 55,252
Int. Cl. C09b *23/14*
U.S. Cl. 260—240 D                 10 Claims

ABSTRACT OF THE DISCLOSURE

New 4-amino-2-styrylquinazoline derivatives which have the general formula

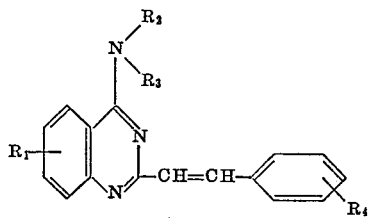

and acid addition salts thereof, are useful as anti-inflammatory agents.

SUMMARY OF THE INVENTION

This invention relates to new 4-amino-2-styrylquinazoline derivatives, as well as acid addition salts thereof, useful as anti-inflammatory agents, which have the formula (I)

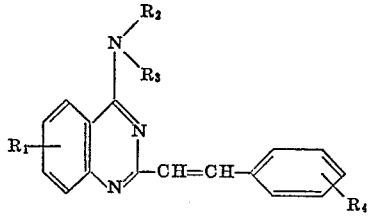

wherein $R_1$ is hydrogen, halogen, nitro, lower alkyl or lower alkoxy; $R_2$ is hydrogen, lower alkyl, hydroxy-lower alkyl or lower alkoxy-lower alkyl; $R_3$ is hydrogen, lower alkyl, hydroxy-lower alkyl, lower alkoxy-lower alkyl, $$\text{lower alkylene}-N\begin{smallmatrix}R_5\\R_6\end{smallmatrix}$$

or $$\text{(hydroxy) lower alkylene}-N\begin{smallmatrix}R_5\\R_6\end{smallmatrix}$$

$R_4$ is hydrogen, halogen, lower alkyl or lower alkoxy; $R_5$ and $R_6$ each is hydrogen, lower alkyl or lower alkoxy; and in addition, each of the basic nitrogen groups $$-N\begin{smallmatrix}R_2\\R_3\end{smallmatrix}$$

and $$-N\begin{smallmatrix}R_5\\R_6\end{smallmatrix}$$

is a 5- to 7-membered nitrogen monocyclic heterocyclic radical of up to 18 atoms (exclusive of hydrogen).

The symbols have these meanings throughout this specification.

DETAILED DESCRIPTION OF THE INVENTION

The halogens represented by the symbols include the four common halogens, but chlorine and bromine are preferred. The lower alkyl groups include straight or branched chain hydrocarbon groups of up to 7 carbon atoms like methyl, ethyl, propyl, isopropyl, butyl, t-butyl and the like, the first two being preferred. The lower alkylene groups are hydrocarbon groups of the same kind. The lower alkoxy and hydroxy-lower alkyl groups similarly include such alkyl groups linked to an oxygen atom or hydroxy group, respectively, e.g., methoxy, propoxy, ethoxy, isopropoxy, hydroxymethyl, hydroxyethyl and the like. The lower alkoxy-lower alkyl groups are made up of similar radicals. The (hydroxy)lower alkylene $$-N\begin{smallmatrix}R_5\\R_6\end{smallmatrix}$$

group includes lower alkylene groups of the type referred to above in which one hydroxy group may be attached to any one of the carbons in the chain.

In the basic nitrogen containing radical (II)   $$-N\begin{smallmatrix}R_2\\R_3\end{smallmatrix}$$

in Formula I, $R_2$ and $R_3$ each represents hydrogen, lower alkyl, hydroxy-lower alkyl or lower alkoxy-lower alkyl forming such basic groups as amino, lower alkylamino, e.g., methylamino, ethylamino, isopropylamino, di(lower alkyl)amino, e.g., dimethylamino, diethylamino, dipropylamino, (hydroxy-lower alkyl)amino, e.g., hydroxyethylamino, di(hydroxy-lower alkyl)amino, e.g., di(hydroxyethyl)amino, (lower alkoxy-lower alkyl)amino, e.g., methoxymethylamino, 2-methoxyethylamino, or di(lower alkoxy-lower alkyl)amino, e.g., di(methoxymethyl)amino, and the like.

In addition the nitrogen may join with the groups represented by $R_2$ and $R_3$ to form a 5 to 7 membered monocyclic heterocyclic containing, if desired, an oxygen, sulfur or an additional nitrogen atom, (not more than two hereto atoms althogether), e.g., piperidino, pyrrolidino, morpholino, thiamorpholino, piperazino, hexamethyleneimino and homopiperazino radicals. These heterocyclic groups may also be substituted by one or two groups lower alkyl, lower alkoxy, hydroxy-lower alkyl or alkanoyloxy-lower alkyl. The lower alkyl, lower alkoxy and hydroxy-lower alkyl groups are the same as those already described; the alkanoyl moieties are the acyl radicals of lower fatty acids, including for example, acetyl, propionyl, butyryl and the like, as well as acyl radicals of higher fatty acids of up to 14 carbons.

Heterocyclic groups represented by the radical II include for example, piperidino, di(lower alkyl)piperidino, e.g., 2,3-dimethylpiperidino, 2-, 3- or 4-(lower alkoxy)piperidino, e.g., 2-methoxypiperidino, 2-, 3- or 4-(lower alkyl) piperidino, e.g., 2-, 3- or 4-methylpiperidino, N-methylpiperidino, pyrrolidino, (lower alkyl)pyrrolidino, e.g., 2-methylpyrrolidino, di(lower alkyl)pyrrolidino, e.g., 2,3-dimethylpyrrolidino, (lower alkoxy)pyrrolidino, e.g., 2-ethoxypyrrolidino, N-lower alkylpyrrolidino, e.g., N-methylpyrrolidino, morpholino, (lower alkyl)morpholino, e.g., N-methylmorpholino or 2-methylmorpholino, di(lower alkyl)morpholino, e.g., 2,3-dimethylmorpholino, (lower alkoxy)morpholino, e.g., 2-ethoxymorpholino, thiamorpholino, (lower alkyl)thiamorpholino, e.g., N-methylthiamorpholino or 2-methylthiamorpholino, di(lower alkyl)thiamorpholino, e.g., 2,3-diethylthiamorpholino, 2,3-dimethylthiamorpholino, (lower alkoxy)thiamorpholino, e.g., 2-methoxythiamorpholino, piperazino, (lower alkyl)piperazino, e.g., 4-methylpiperazino, 2-methylpiperazino, (hydroxy-lower alkyl)piperazino, e.g., 4-(2-hydroxyethyl)piperazino, di(lower alkyl)piperazino, e.g., 2,3-dimethylpiperazino, alkanoyloxy(lower alkyl)piperazino, e.g., $N^4$-(2-dodecanoyloxyethyl)piperazino, hexamethyleneimino and homopiperazino.

Moreover, particularly when $R_2$ is hydrogen, $R_3$ may be the basic group

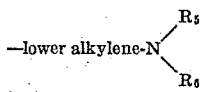

or such a group containing one hydroxy group on a carbon of the lower alkylene chain. The basic group (III)

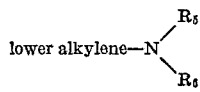

of the

or

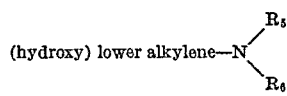

radicals includes acyclic amine groups of the same kind as

e.g., amino, lower alkylamino, di-lower alkoxyamino, as well as the same 5- to 6-membered, unsubstituted and substituted nitrogen heterocyclics.

The compounds of Formula I form salts which are also part of this invention. The salts include acid-addition salts, particularly the non-toxic, physiologically acceptable members. The bases of Formula I form salts by reaction with a variety of inorganic and organic acids providing acid addition salts including, for example, hydrohalides (especially hydrochloride and hydrobromide), sulfate, nitrate, borate, phosphate, oxalate, tartrate, maleate, citrate, acetate, ascorbate, succinate, benzenesulfonate, methanesulfonate, cyclohexanesulfamate, toluenesulfonate and the like. The acid addition salts frequently provide a convenient means for isolating the product, e.g., by forming and precipitating the salt in a medium in which the salt is insoluble, then after separation of the salt, neutralizing with a base such as barium hydroxide or sodium hydroxide, to obtain the free base of Formula I. Other salts may then be formed from the free base by reaction with an equivalent acid.

Preferred are those compounds of Formula I wherein $R_1$ and $R_4$ are both hydrogen or $R_1$ is halogen, especially chlorine and $R_4$ is hydrogen. Preferably also, $R_2$ is hydrogen, especially when $R_3$ is di(lower alkyl)amino-lower alkylene, the lower alkylene particularly containing 5 carbons. Morpholino and 4-methylpiperazino are also preferred

radicals. The hydrochlorides are preferred acid addition salts.

The new compounds of this invention have anti-inflammatory properties and are useful as anti-inflammatory agents, for example, to reduce local inflammatory conditions such as those of an edematous nature or resulting from proliferation of connective tissue in various mammalian species such as rats, dogs and the like when given orally in dosages of about 5 to 50 mg./kg./day, preferably 5 to 25 mg./kg./day, in single or 2 to 4 divided doses, as indicated by the carageenan edema assay in rats. The active substance may be utilzed in compositions such as tablets, capsules, solutions or suspensions containing up to about 300 mg. per unit of dosage of a compound or mixture of compounds of Formula I or physiologically acceptable acid addition salt thereof. They may be compounded in conventional manner with a physiologically acceptable vehicle or carrier, excipient, binder, preservative, stabilizer, flavor, etc. as called for by accepted pharmaceutical practice. Topical preparations containing about 0.01 to 3 percent by weight of active substance in a lotion, salve or cream may also be used.

The compounds of this invention are produced from 2-styryl-4-quinazolinones of the formula (IV)

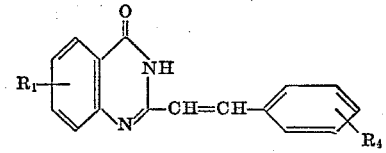

which are treated with phosphorus oxychloride or equivalent halogenating agent in the presence of a tertiary amine like dimethylaniline and in an organic solvent like benzene, dimethylformamide or the like, preferably at an elevated temperature, to form new intermediates of the formula (V)

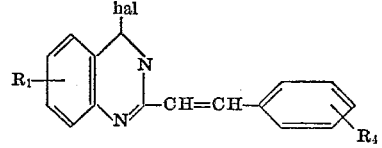

The intermediate of Formula V is then made to react with an amine.

(VI)

in a hydrocarbon solvent like benzene or toluene or in ether, dioxane, tetrahydrofuran or the like, preferably at an elevated temperature to obtain a product of Formula I.

The salts are formed as described above.

The 2-styryl-4-quinazolones of Formula IV may be produced by reacting a quinazolone of the formula (VII)

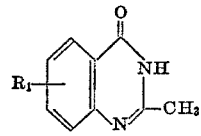

with an unsubstituted or substituted benzaldehyde (VIII)

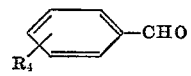

in the presence of a metal halide like zinc chloride (which is preferred) or aluminum chloride at a temperature of about 180° to 200° C.

Alternatively an amide of the formula (IX)

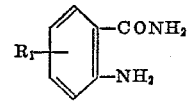

may be reacted with a compound of the formula (X)

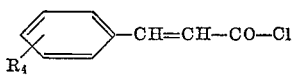

in an anhydrous solvent such as dioxane, tetrahydrofuran, or the like, in the presence of an acid binding agent such as pyridine, triethylamine or the like, to obtain a compound of the formula (XI)

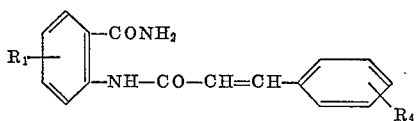

The compound of Formula XI is treated with a strong metal hydroxide like sodium or potassium hydroxide to eliminate water and produce a compound of Formula IV.

The following examples are illustrative of the invention and constitute preferred embodiments. Other members of the class may be similarly produced by varying the starting materials with the appropriately substituted analogs. All temperatures are on the centigrade scale.

The following examples are illustrative of the preparation of new intermediates of Formula V:

Example 1

A mixture of 28.3 gms. of 6-chloro-2-styryl-4(3H)-quinazolinone, 48.46 gms. (0.4 mol.) of dimethylaniline, 21.46 gms. (0.14 mol.) of phosphorous oxychloride and 350 ml. of benzene are refluxed with stirring for four hours. The solution is filtered while hot, and, after cooling to room temperature, is shaken with water. The benzene layer is separated, dried with calcium sulfate and concentrated. The residue crystallizes upon treatment with petroleum ether. The yield is 24.5 gms. of 4,6-dichloro-2-styryl quinazoline, M.P. 144–145°. The compound may be recrystallized from benzene, but is, however, pure enough for further conversion.

The following additional 4-chloro-2-styryl quinazolines are produced by the foregoing procedure from the appropriately substituted 2-styryl-4(3H)quinazolinone:

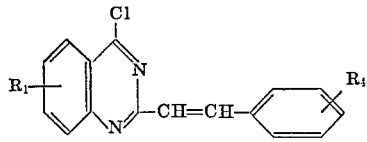

| Example | R₁ | R₄ | Melting point (deg.) |
|---|---|---|---|
| 2 | H | H | 91–93 |
| 3 | 7-Cl | H | 169–170 |
| 4 | 7-OCH₃ | H | 129–132 |
| 5 | 6-NO₂ | H | 209–211 |
| 6 | H | 4-Cl | 175–178 |
| 7 | 6-OCH₃ | H | 143–145 |
| 8 | 6-OCH₃ | 4-Cl | 169–170 |
| 9 | 7-Cl | 4-Cl | 199–200 |

The following examples are illustrative of the preparation of new compounds of Formula I:

Example 10

8.4 gms. (0.028 mol.) of 4,7-dichloro-2-styrylquinazoline and 9.6 gms. of 5-diethylamino-2-pentylamine are refluxed with 90 ml. of benzene for 15 hours. The reaction mixture is cooled and the precipitated crystals of 5-diethylamino-5-pentylamine hydrochloride are filtered under suction. The filtrate is concentrated and the residue is treated with 2 N sodium hydroxide solution. The organic phase is taken up in ether, the ether solution is dried with calcium sulfate, filtered and evaporated to dryness. The yield is 9.25 gms. of 7-chloro-4[[4-(diethylamino)-1 - methylbutyl]amino] - 2-styrylquinazoline, M.P. 120–122°. The product is recrystallized from n-heptane.

6.6 gms. of the above product is dissolved in 50 ml. of isopropanol and treated with alcoholic hydrochloric acid until the pH is in the range of 2 to 3. The mixture is filtered under suction to obtain 7.8 gms. of 4-[[4-(diethylamino) - 1-methylbutyl]amino]-2-styrylquinazoline, dihydrochloride, M.P. 258–261° (dec.).

The following additional compounds are obtained by the same procedure described above substituting the appropriate starting materials:

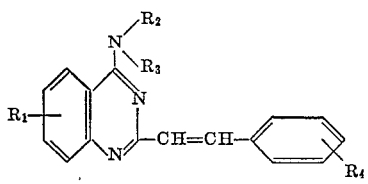

| Example | R₁ | R₄ | —N(R₂)(R₃) | Melting point (deg.) Base | Salt |
|---|---|---|---|---|---|
| 11 | H | H | —NH—CH(CH₃)—(CH₂)₃—N(C₂H₅)(C₂H₅) | 101–102 | 236–244 (2HCl) |
| 12 | 6-Cl | H | Same as above | 118–119 | 266–270 (2HCl) |
| 13 | 6-NO₂ | H | do | 121–122 | 247–252 (1HCl) |
| 14 | 7-Cl | 4-Cl | do | 99–102 | 286–288 (2HCl) |
| 15 | H | 4-Cl | do | 100–102 | 268–270 (2HCl·1/2H₂O) |
| 16 | OCH₃ | H | do | 113–116 | 275–277 (2HCl) |
| 17 | 6-OCH₃ | 4-Cl | do | 154–155 | 284–285 (2HCl) |
| 18 | H | H | —N(morpholino) | 147–148 | |
| 19 | H | 4-Cl | Same as above | 136–137 | |
| 20 | 7-Cl | 4-Cl | do | 191–192 | |
| 21 | 6-OCH₃ | H | do | 138–139 | |
| 22 | 7-OCH₃ | H | do | 139–140 | |
| 23 | 6-Cl | H | —N(piperazinyl)N—CH₃ | | ¹ 250 (1.5HCl·0.5H₂O) |
| 24 | 7-OCH₃ | H | —NH—CH(CH₃)—(CH₂)₃—N(C₂H₅)(C₂H₅) | 85–89 | 198–200 (2HCl·2H₂O) |

| Example | R₁ | R₄ | —N(R₂)(R₃) | Melting point (deg.) Base | Salt |
|---|---|---|---|---|---|
| 25 | H | H | —NH—CH₂CH(OH)CH₂N(CH₃)(CH₃) | | |
| 26 | H | H | —NHCH₂CH₂N⟩—N—CH₂CH₂OH | | |
| 27 | H | 2-OCH₃ | —NHCH₂CH₂—N(CH₂CH₂OH)(CH₂CH₂OH) | | |
| 28 | 6-CH₃ | 3-CH₃ | —NHCH₂CH₂—N⟩N | | |

¹ Dec.

Example 29

70 gms. of 6-methoxy - 2 - methyl-4(3H)-quinazolinone and 260 gms. of p-chlorobenzaldehyde are admixed and the mixture is placed on a bath preheated to 200°. After a short time a clear melt results. 14 gms. of anhydrous zinc chloride are added and the resulting water is drawn off by water vacuum. After a short time the contents of the flask solidify. The mixture is added at 200° for an additional 15 minutes, then cooled, ethanol is added and then filtered under suction. The yield amounts to 111.7 gms. of 2-(p-chlorostyryl)-6-methoxy-4(3H)-quinazolinone, M.P. 318–320°.

Example 30

136.2 gms. of anthranilamide (1 mol.) are dissolved in 2 liters of dioxane. 71 gms. of pyridine are added and then 175 gms. (1.05 mol.) of cinnamoyl chloride are added all at once. The mixture is stirred for 30 minutes and then poured into 4 liters of water. After filtering under suction, washing with water and drying, there are obtained 260 gms. of 2'-carbamoylcinnamanilide, M.P. 233–237°. This product is suspended in 12 liters of boiling water and sodium hydroxide is added to the suspension until a clear solution results. Upon the addition of glacial acetic acid, 2-styryl-4(3H)-quinazolinone precipitates which is filtered under suction, washed with hot water and then dried. The yield amounts to 238 gms., M.P. 248–252°.

What is claimed is:

1. A compound of the formula

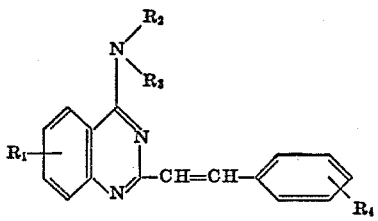

wherein

R₁ is hydrogen, halogen, nitro, lower alkyl or lower alkoxy; R₂ is hydrogen, lower alkyl, hydroxy-lower alkyl or lower alkoxy-lower alkyl; R₃ is

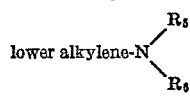

R₄ is hydrogen, halogen, lower alkyl or lower alkoxy; R₅ and R₆ each is hydrogen, lower alkyl or lower alkoxy; and in addition the group

is a member of the group consisting of piperidino, di-(lower alkyl)piperidino, (lower alkoxy)piperidino, (lower alkyl)piperidino, pyrrolidino, (lower alkyl)pyrrolidino, di(lower alkyl)pyrrolidino, (lower alkoxy) pyrrolidino, morpholino, (lower alkyl)morpholino, di-(lower alkyl)morpholino, (lower alkoxy)morpholino, thiamorpholino, (lower alkyl)thiamorpholino, di(lower alkyl)thiamorpholino, (lower alkoxy)thiamorpholino, piperazino, (lower alkyl)piperazino, (hydroxylower alkyl)piperazino, di(lower alkyl)piperazino, alkanoyloxy(lower alkyl)piperazino, hexamethyleneimino and homopiperazino;

and acid addition salts thereof.

2. A compound as in claim 1 wherein R₁ and R₄ each is hydrogen.

3. A compound as in claim 1 wherein R₁ is halogen and R₄ is hydrogen.

4. A compound as in claim 3 wherein the halogen is chlorine.

5. A compound as in claim 3 wherein R₂ is hydrogen and R₃ is di-lower alkylamino-lower alkylene.

6. A compound as in claim 4 wherein R₂ is hydrogen and R₃ is (diethylamino) (methylbutyl)amino.

7. 7-chloro - 2 - (4 - chlorostyryl) - 4 - [[4 - (diethylamino) - 1 - methylbutyl]amino]quinazoline.

8. A compound of the formula

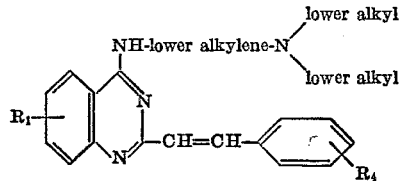

wherein R₁ is hydrogen, halogen, nitro, lower alkyl or lower alkoxy; and R₄ is hydrogen, halogen, lower alkyl or lower alkoxy.

9. A compound as in claim 1 wherein R₁ and R₄ each is halogen.

10. A compound as in claim 9 wherein R₂ is hydrogen.

References Cited

UNITED STATES PATENTS

| | | | |
|---|---|---|---|
| 2,461,950 | 2/1949 | Wolf | 260—256.4 Q |
| 3,184,462 | 5/1965 | Scarborough et al. | 260—256.4 Q |
| 3,301,855 | 1/1967 | Blatter | 260—256.4 Q |

OTHER REFERENCES

Serzhanina et al.: Zhur. Organ. Khim., vol. 7, pp. 1303–6 (1965) (translated version in English, pp. 1317–1320).

Kovendi et al.: Chem. Ber., vol. 98, pp. 1049 to 1059 (1965).

Dhatt, Current Science, vol. 30, pp. 179 to 180 (1961).

JOHN D. RANDOLPH, Primary Examiner

U.S. Cl. X.R.

424—246, 248, 251; 260—558 A, 559 A